(12) United States Patent
Chang et al.

(10) Patent No.: US 12,220,958 B2
(45) Date of Patent: Feb. 11, 2025

(54) SUSPENSION APPARATUS FOR VEHICLE

(71) Applicants: Hyundai Motor Company, Seoul (KR); Kia Corporation, Seoul (KR)

(72) Inventors: Sehyun Chang, Whasung-Si (KR); Youngil Sohn, Whasung-Si (KR); Jun Ho Seong, Whasung-Si (KR); Min Jun Kim, Whasung-Si (KR); Sang Woo Hwang, Whasung-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/131,240

(22) Filed: Apr. 5, 2023

(65) Prior Publication Data

US 2024/0100898 A1 Mar. 28, 2024

(30) Foreign Application Priority Data

Sep. 27, 2022 (KR) .................. 10-2022-0122033

(51) Int. Cl.
  *B60G 17/015* (2006.01)
  *B60G 3/18* (2006.01)
  (Continued)

(52) U.S. Cl.
  CPC ........... *B60G 17/0157* (2013.01); *B60G 3/18* (2013.01); *B60G 3/20* (2013.01); *B60G 7/001* (2013.01);
  (Continued)

(58) Field of Classification Search
  CPC .... B60G 17/0157; B60G 3/20; B60G 15/067; B60G 2202/114; B60G 2202/22;
  (Continued)

(56) References Cited

U.S. PATENT DOCUMENTS

| | | | | |
|---|---|---|---|---|
| 1,302,489 A | * | 4/1919 | Hollis | B60B 35/109 |
| | | | | 301/124.1 |
| 1,840,407 A | * | 1/1932 | Norman | B60L 15/2054 |
| | | | | 180/65.6 |

(Continued)

FOREIGN PATENT DOCUMENTS

| | | |
|---|---|---|
| CN | 104044423 B | 6/2016 |
| CN | 206589590 U | 10/2017 |

(Continued)

OTHER PUBLICATIONS

A. Giorgetti et al., (Univ. degli Studi di Firenze), Design and testing of a MRF rotational damper for vehicle applications, 2010; IOP Publishing; p. 2-8.

*Primary Examiner* — Timothy Wilhelm
(74) *Attorney, Agent, or Firm* — Morgan, Lewis & Bockius LLP

(57) ABSTRACT

A suspension includes a knuckle to which a wheel of a vehicle is fastened, a steering drive portion connected to the knuckle, a lower arm positioned at a lower end portion of the steering drive portion and including a first end portion connected to the knuckle and a second end portion connected to a vehicle body frame, a connecting link including a first end portion connected to an upper end portion of the steering drive portion, an upper arm connected to a second end portion of the connecting link, a damper connecting the upper arm and the vehicle body frame, and a push rod including a first end portion connected to the upper arm and a second end portion connected to the lower arm.

15 Claims, 5 Drawing Sheets

(51) Int. Cl.
- *B60G 3/20* (2006.01)
- *B60G 7/00* (2006.01)
- *B60G 7/04* (2006.01)
- *B60G 11/08* (2006.01)
- *B60G 15/06* (2006.01)
- *B62D 5/04* (2006.01)
- *B62D 7/15* (2006.01)
- *B62D 7/16* (2006.01)

(52) U.S. Cl.
CPC ........... *B60G 7/04* (2013.01); *B60G 11/08* (2013.01); *B60G 15/067* (2013.01); *B62D 5/0418* (2013.01); *B62D 7/15* (2013.01); *B62D 7/16* (2013.01); *B60G 2200/14* (2013.01); *B60G 2200/18* (2013.01); *B60G 2200/184* (2013.01); *B60G 2200/44* (2013.01); *B60G 2202/114* (2013.01); *B60G 2202/22* (2013.01); *B60G 2202/42* (2013.01); *B60G 2204/143* (2013.01); *B60G 2204/148* (2013.01); *B60G 2204/422* (2013.01); *B60G 2206/10* (2013.01); *B60G 2600/182* (2013.01); *B60Y 2400/86* (2013.01)

(58) Field of Classification Search
CPC  B60G 2202/42; B60G 2600/182; B60G 3/18; B60G 7/001; B60G 7/04; B60G 11/08; B60G 2200/14; B60G 2200/18; B60G 2200/184; B60G 2200/44; B60G 2204/143; B60G 2204/148; B60G 2204/422; B60G 2206/10; B60G 2204/121; B60G 2204/4232; B60G 2206/15; B60G 2206/11; B60G 17/015; B60G 2300/27; B62D 7/15; B62D 7/18; B62D 5/0418; B62D 7/16; B60Y 2400/86

See application file for complete search history.

(56) References Cited

U.S. PATENT DOCUMENTS

| | | | | | |
|---|---|---|---|---|---|
| 2,043,488 | A * | 6/1936 | Peo | ............ | F16F 9/145 267/246 |
| 2,299,241 | A * | 10/1942 | Kumm | ............ | B60G 3/01 267/254 |
| 2,936,034 | A * | 5/1960 | Der Lely | ............ | B60B 35/14 180/41 |
| 3,085,644 | A * | 4/1963 | Der Lely | ............ | B62D 1/12 180/440 |
| 3,236,324 | A * | 2/1966 | Levratto | ............ | B62D 49/0607 180/242 |
| 3,306,390 | A * | 2/1967 | Georges | ............ | B62D 61/12 180/41 |
| 3,509,957 | A * | 5/1970 | Loffler | ............ | B60G 3/24 280/124.13 |
| 3,572,458 | A * | 3/1971 | Tax | ............ | B62D 7/02 180/411 |
| 3,899,037 | A * | 8/1975 | Yuker | ............ | B60G 17/01925 180/41 |
| 4,003,584 | A * | 1/1977 | Zelli | ............ | B66F 11/048 280/47.11 |
| 4,241,803 | A * | 12/1980 | Lauber | ............ | B60P 3/40 280/765.1 |
| 4,355,697 | A * | 10/1982 | Orlandea | ............ | B60K 17/303 180/261 |
| 4,363,374 | A * | 12/1982 | Richter | ............ | B62D 49/0607 180/209 |
| 4,395,191 | A * | 7/1983 | Kaiser | ............ | E02F 9/085 180/7.1 |
| 4,802,688 | A * | 2/1989 | Murakami | ............ | B60G 7/008 280/124.138 |
| 4,871,187 | A * | 10/1989 | Schaible | ............ | B60G 15/062 280/124.136 |
| 5,039,129 | A * | 8/1991 | Balmer | ............ | B60G 3/04 180/209 |
| 5,080,389 | A * | 1/1992 | Kawano | ............ | B60G 3/20 280/124.142 |
| 5,121,808 | A * | 6/1992 | Visentini | ............ | B62D 49/0678 301/128 |
| 5,137,101 | A * | 8/1992 | Schaeff | ............ | B62D 57/00 180/8.1 |
| 5,439,244 | A * | 8/1995 | Tomosada | ............ | B60G 3/265 280/124.142 |
| 5,655,615 | A * | 8/1997 | Mick | ............ | B62D 49/0607 280/5.2 |
| 5,782,484 | A * | 7/1998 | Kuhn, Jr. | ............ | B60G 3/265 267/248 |
| 5,938,219 | A * | 8/1999 | Hayami | ............ | B60G 3/20 280/124.135 |
| 6,036,201 | A * | 3/2000 | Pond | ............ | B60G 15/12 280/5.514 |
| 6,056,304 | A * | 5/2000 | Brambilla | ............ | B60G 9/02 280/124.167 |
| 6,119,882 | A * | 9/2000 | Crook | ............ | B66F 11/046 180/906 |
| 6,199,769 | B1 * | 3/2001 | Weddle | ............ | F16F 9/06 180/906 |
| 6,343,804 | B1 * | 2/2002 | Handke | ............ | B60G 13/006 280/124.145 |
| 6,347,802 | B1 * | 2/2002 | Mackle | ............ | B62D 17/00 280/5.521 |
| 6,443,687 | B1 * | 9/2002 | Kaiser | ............ | E02F 9/024 180/209 |
| 6,540,243 | B2 * | 4/2003 | Takayanagi | ............ | B62K 5/08 280/778 |
| 6,561,307 | B1 * | 5/2003 | Brill | ............ | B62D 5/0418 180/443 |
| 6,568,697 | B1 * | 5/2003 | Brill | ............ | B62D 5/14 280/124.134 |
| 6,681,905 | B2 * | 1/2004 | Edmondson | ............ | B60G 13/02 188/290 |
| 6,726,394 | B2 * | 4/2004 | Garnier | ............ | B61F 5/24 403/135 |
| 6,729,633 | B1 * | 5/2004 | Irwin | ............ | B62D 17/00 280/86.75 |
| 6,752,403 | B2 * | 6/2004 | Allen | ............ | B60G 17/005 280/124.1 |
| 6,761,234 | B1 * | 7/2004 | Lamela | ............ | B62D 7/142 280/8 |
| 6,776,425 | B2 * | 8/2004 | Britton | ............ | B62D 13/06 280/103 |
| 6,783,137 | B2 * | 8/2004 | Nagreski | ............ | F16C 19/54 280/124.135 |
| 6,968,913 | B1 * | 11/2005 | Priepke | ............ | E02F 9/02 180/6.24 |
| 7,111,857 | B2 * | 9/2006 | Timoney | ............ | B62D 55/112 280/124.128 |
| 7,117,599 | B2 * | 10/2006 | Sadanowicz | ............ | B62D 7/18 29/894.362 |
| 7,140,625 | B2 * | 11/2006 | Dean | ............ | B60G 13/006 280/93.512 |
| 7,198,121 | B2 * | 4/2007 | Lamela | ............ | B60K 17/342 474/144 |
| 7,198,278 | B2 * | 4/2007 | Donaldson | ............ | B62D 49/08 180/209 |
| 7,204,341 | B2 * | 4/2007 | Lundmark | ............ | B62D 5/0418 180/444 |
| 7,294,082 | B2 * | 11/2007 | Lim | ............ | B62D 7/142 475/221 |
| 7,398,982 | B2 * | 7/2008 | Hozumi | ............ | B60G 3/20 280/124.135 |
| 7,762,372 | B2 * | 7/2010 | LeBlanc, Sr. | ............ | B62D 7/18 180/385 |
| 7,841,802 | B2 * | 11/2010 | Fockersperger, Jr. | .. | E02F 5/102 405/184 |
| 7,862,057 | B2 * | 1/2011 | Hilmann | ............ | B62D 7/06 280/93.511 |

(56) References Cited

U.S. PATENT DOCUMENTS

| | | | | |
|---|---|---|---|---|
| 7,866,434 B2* | 1/2011 | Shiino | | B62D 7/08 |
| | | | | 280/93.512 |
| 7,891,674 B2* | 2/2011 | Vaxelaire | | B60G 7/001 |
| | | | | 280/86.758 |
| 7,914,025 B2* | 3/2011 | Mayen | | B60G 7/001 |
| | | | | 280/124.109 |
| 7,926,613 B2* | 4/2011 | Matsuda | | B62D 5/008 |
| | | | | 180/443 |
| 8,051,940 B2* | 11/2011 | Ziech | | B60K 7/0015 |
| | | | | 180/257 |
| 8,152,185 B2* | 4/2012 | Siebeneick | | B60G 7/008 |
| | | | | 280/124.134 |
| 8,170,792 B2* | 5/2012 | Mizuno | | B60G 17/016 |
| | | | | 701/409 |
| 8,205,900 B1* | 6/2012 | Moravy | | B60G 3/20 |
| | | | | 280/124.138 |
| 8,267,416 B2* | 9/2012 | Allen | | B60G 3/20 |
| | | | | 280/124.135 |
| 8,286,979 B2* | 10/2012 | Schote | | B60G 3/20 |
| | | | | 280/124.135 |
| 8,322,729 B2* | 12/2012 | Michel | | B60G 7/008 |
| | | | | 280/5.52 |
| 8,376,078 B2* | 2/2013 | Hiddema | | B60B 35/001 |
| | | | | 180/209 |
| 8,490,983 B2* | 7/2013 | Schmid | | B60G 7/008 |
| | | | | 280/5.521 |
| 8,573,615 B2* | 11/2013 | Kuwabara | | B60G 3/06 |
| | | | | 280/124.145 |
| 8,690,177 B2* | 4/2014 | Buchwitz | | G06F 16/245 |
| | | | | 280/124.135 |
| 9,266,557 B2* | 2/2016 | Matayoshi | | B60G 3/20 |
| 9,333,824 B2* | 5/2016 | Zandbergen | | B60G 3/20 |
| 9,387,881 B2* | 7/2016 | Smith | | B60G 11/28 |
| 9,643,464 B2* | 5/2017 | Zandbergen | | B60G 3/20 |
| 9,821,835 B2* | 11/2017 | Ferrer-Dalmau Nieto | | |
| | | | | B62D 5/26 |
| 9,969,228 B2* | 5/2018 | Hall | | B60G 3/20 |
| 10,106,006 B2* | 10/2018 | Andou | | B60G 13/005 |
| 10,160,486 B2* | 12/2018 | Kim | | B62D 15/023 |
| 10,350,955 B2* | 7/2019 | Langhoff | | B60G 3/20 |
| 10,604,186 B2* | 3/2020 | Tanaka | | B60G 3/20 |
| 10,745,051 B2* | 8/2020 | Tanaka | | B62D 21/11 |
| 10,806,106 B2* | 10/2020 | Olson | | B62D 17/00 |
| 10,940,885 B2* | 3/2021 | Xu | | B62D 5/0418 |
| 11,130,382 B2* | 9/2021 | Nong | | B60G 17/06 |
| 11,192,413 B2* | 12/2021 | Brenner | | B60G 7/008 |
| 11,230,150 B2* | 1/2022 | Aknin | | B60G 15/06 |
| 11,365,782 B2* | 6/2022 | Talon | | F16F 9/585 |
| 11,459,029 B2* | 10/2022 | Ishihara | | B62D 9/00 |
| 11,472,249 B2* | 10/2022 | Kuribayashi | | B60G 15/063 |
| 11,565,548 B2* | 1/2023 | Utsunomiya | | B62D 5/0418 |
| 11,577,778 B2* | 2/2023 | Kim | | B62D 7/1545 |
| 11,584,427 B2* | 2/2023 | Kuribayashi | | B62D 7/18 |
| 11,602,965 B2* | 3/2023 | Kuribayashi | | B60G 7/008 |
| 11,654,967 B2* | 5/2023 | Ryu | | B60G 17/0165 |
| | | | | 280/5.51 |
| 11,660,921 B2* | 5/2023 | Moon | | B62D 7/18 |
| | | | | 180/65.51 |
| 11,760,188 B2* | 9/2023 | Obermeyer | | B62D 7/06 |
| | | | | 180/65.51 |
| 11,820,449 B2* | 11/2023 | Chang | | B62D 7/06 |
| 11,865,922 B2* | 1/2024 | Ameye | | B62D 7/06 |
| 11,872,889 B2* | 1/2024 | Choi | | B60K 7/0007 |
| 11,890,942 B2* | 2/2024 | Kim | | B60B 27/0021 |
| 2003/0205424 A1* | 11/2003 | Felsing | | B60G 7/008 |
| | | | | 180/242 |
| 2003/0234504 A1* | 12/2003 | Frantzen | | B60G 3/20 |
| | | | | 280/93.512 |
| 2004/0084822 A1* | 5/2004 | Collyer | | F16F 1/30 |
| | | | | 267/293 |
| 2005/0280241 A1* | 12/2005 | Bordini | | B60G 3/18 |
| | | | | 280/124.135 |
| 2007/0045036 A1* | 3/2007 | Takeuchi | | B62D 5/0418 |
| | | | | 280/124.145 |
| 2008/0067773 A1* | 3/2008 | Chalin | | B60G 7/001 |
| | | | | 280/124.135 |
| 2010/0206647 A1* | 8/2010 | Ishii | | B62D 9/00 |
| | | | | 180/6.24 |
| 2010/0276904 A1* | 11/2010 | Pavuk | | B60G 3/202 |
| | | | | 280/124.135 |
| 2012/0242055 A1* | 9/2012 | Starck | | B60G 15/068 |
| | | | | 267/141 |
| 2013/0020775 A1* | 1/2013 | Beji | | B60B 35/10 |
| | | | | 280/43 |
| 2014/0353054 A1* | 12/2014 | Matayoshi | | B62D 5/0421 |
| | | | | 180/55 |
| 2016/0144891 A1* | 5/2016 | Reubens | | B62D 7/06 |
| | | | | 280/93.512 |
| 2017/0137059 A1* | 5/2017 | Ohba | | B60G 3/26 |
| 2019/0283515 A1* | 9/2019 | Paerewyck | | F16C 23/045 |
| 2020/0223478 A1* | 7/2020 | Sano | | B60G 15/062 |
| 2021/0008939 A1* | 1/2021 | Schmidt | | B62D 7/146 |
| 2021/0245561 A1* | 8/2021 | Sardes | | B60G 3/207 |
| 2021/0270343 A1* | 9/2021 | Battlogg | | F16F 9/145 |
| 2022/0065623 A1* | 3/2022 | Hirt | | B60K 17/30 |
| 2022/0073136 A1* | 3/2022 | Min | | B62D 7/14 |
| 2022/0204078 A1* | 6/2022 | Aknin | | B60G 7/006 |
| 2022/0297487 A1* | 9/2022 | Sardes | | B62D 7/16 |
| 2022/0379660 A1* | 12/2022 | Choi | | B60K 7/00 |
| 2022/0379676 A1* | 12/2022 | Joo | | B60G 3/20 |
| 2023/0051754 A1* | 2/2023 | Chang | | B62D 5/001 |
| 2023/0115506 A1* | 4/2023 | Chang | | B62D 7/18 |
| | | | | 180/408 |
| 2023/0129358 A1* | 4/2023 | Chang | | B62D 7/1545 |
| | | | | 74/422 |
| 2023/0137268 A1* | 5/2023 | Chang | | B62D 7/146 |
| | | | | 280/93.512 |
| 2023/0150575 A1* | 5/2023 | Chang | | B62D 7/06 |
| | | | | 180/444 |
| 2023/0159086 A1* | 5/2023 | Lee | | B62D 7/146 |
| | | | | 180/413 |
| 2023/0234415 A1* | 7/2023 | Seong | | B60G 7/02 |
| | | | | 280/93.512 |
| 2023/0234417 A1* | 7/2023 | Di Vittorio | | B60G 13/14 |
| | | | | 280/5.515 |
| 2023/0302860 A1* | 9/2023 | Jeon | | B62D 5/0418 |
| 2023/0322299 A1* | 10/2023 | Wuebbolt-Gorbatenko | | |
| | | | | B60K 7/0007 |
| | | | | 180/444 |
| 2023/0391181 A1* | 12/2023 | Min | | B60G 3/00 |

FOREIGN PATENT DOCUMENTS

| | | | | |
|---|---|---|---|---|
| CN | 112092554 A | 12/2020 | | |
| DE | 102016214199 A1 * | 2/2018 | | |
| KR | 10-0535111 B | 12/2005 | | |
| KR | 10-2094035 B | 3/2020 | | |
| KR | 2020-0027401 A | 3/2020 | | |
| WO | WO-2015144482 A1 * | 10/2015 | | B60G 3/20 |
| WO | WO 2022-077059 A | 4/2022 | | |

* cited by examiner

SUSPENSION APPARATUS FOR VEHICLE

CROSS-REFERENCE TO RELATED APPLICATION

The present application claims priority to Korean Patent Application No. 10-2022-0122033 filed on Sep. 27, 2022, the entire contents of which is incorporated herein for all purposes by this reference.

BACKGROUND OF THE PRESENT DISCLOSURE

Field of the Present Disclosure

The present disclosure relates to a suspension apparatus, and to a suspension apparatus which provides a suspension structure provided, to each wheel, as disposed between a knuckle thereof and a vehicle body fastened thereto and includes a 6-bar link structure which may implement an ultra-low ground clearance of a vehicle.

Description of Related Art

In general, a suspension is a device which is present between a vehicle body and a wheel and connects these two rigid bodies with an upper arm and a lower arm, alleviating an impact or a vibration received from a road surface while a vehicle travels and improving ride comfort and traveling stability, and is vertically supported by a spring, a shock absorber, and the like and functions to appropriately harmonize a relative motion between the vehicle body and the wheel mechanically by appropriately harmonizing high stiffness and flexibility using various arms and rods in other directions.

A suspension applied to a high-performance vehicle or a racing vehicle adopts a geometry variable suspension component to implement handling characteristics suitable for a driver's preference and traveling conditions.

However, recently, a vehicle provided with an independent corner module fastened to each wheel is being developed, and a high ground clearance is essentially required for installing a steering drive part of the independent corner module.

Therefore, there is a problem in that a lower arm and an axle trajectories interfere with each other due to a decreased space limit when a low-height upper arm of the currently applied suspension is simply provided, and thus upper and lower wheel strokes are limited.

Therefore, there is a demand for a suspension structure corresponding to the ultra-low ground clearance even when the independent corner module including the steering drive part is mounted on the vehicle.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a suspension including a 6-bar link structure by providing a connecting link connected between an upper arm and a vehicle body frame.

Furthermore, another object of the present disclosure is to provide a suspension including a rotation type damper and an active suspension to provide a suspension applied to an ultra-low ground clearance.

Furthermore, yet another object of the present disclosure is to provide a multi-joint suspension in which a steering drive portion is fastened to a position corresponding to a kingpin axis.

The objects of the present disclosure are not limited to the above-described objects, and other objects of the present disclosure not mentioned may be understood by the following description and may be seen more clearly by the exemplary embodiments of the present disclosure. Furthermore, the objects of the present disclosure may be achieved by means described in the claims and combinations thereof.

To achieve the objects of the present disclosure, a suspension includes the following configurations.

In accordance with an exemplary embodiment of the present disclosure, a suspension apparatus for a vehicle includes a knuckle to which a wheel of a vehicle is fastened, a steering drive portion connected to the knuckle, a lower arm positioned at a lower end portion of the steering drive portion and including a first end portion connected to the knuckle and a second end portion connected to a vehicle body frame, a connecting link including a first end portion connected to an upper end portion of the steering drive portion, an upper arm connected to a second end portion of the connecting link, a damper connecting the upper arm and the vehicle body frame, and a push rod including a first end portion connected to the upper arm and a second end portion connected to the lower arm.

Furthermore, the suspension apparatus may further include a support link positioned between the upper end portion of the steering drive portion and the connecting link and connecting each other.

Furthermore, the connecting link may include a front connecting link including both end portions connected to a ball joint and a rear connecting link including a first end portion fastened to the upper arm with a rotational joint and a second end portion connected to the support link with the ball joint.

Furthermore, the damper may be configured as a rotation type damper rotatably connected to the upper arm.

Furthermore, the suspension apparatus may further include a leaf spring connecting the vehicle body frame and the lower arm.

Furthermore, the suspension apparatus may further include an active suspension connecting the upper arm and the vehicle body frame.

Furthermore, the active suspension may include a reducer and a drive motor and may be connected to the reducer so that the upper arm is rotated.

Furthermore, the suspension apparatus may further include a stopper fixed to the upper arm to suggest a vertical behavior of the wheel.

Furthermore, a steering axis of the steering drive portion may be configured to be aligned with a kingpin axis of the wheel.

Furthermore, a steering axis of the steering drive portion may be configured to be connected to the knuckle by coupling a rack and a tie rod.

Furthermore, the steering drive portion may include a steering motor portion and a reducer.

The present disclosure can obtain the following effects by a configuration, combination, and use relationship described below with the above-described embodiments.

According to an exemplary embodiment of the present disclosure, it is possible to provide the suspension structure including the steering drive portion by providing the suspension which may be mounted on the ultra-low ground clearance.

Furthermore, according to an exemplary embodiment of the present disclosure, it is possible to provide the suspension having no interference between components due to the ultra-low ground clearance property.

Furthermore, according to an exemplary embodiment of the present disclosure, it is possible to provide the suspension which can control the stroke amount of the wheel by providing the damper and the active suspension structure for limiting the rotation force of the upper arm in response to the wheel stroke.

It is understood that the term "automotive" or "vehicular" or other similar term as used herein is inclusive of motor automotives in general such as passenger automobiles including sports utility automotives (operation SUV), buses, trucks, various commercial automotives, watercraft including a variety of boats and ships, aircraft, and the like, and includes hybrid automotives, electric automotives, plug-in hybrid electric automotives, hydrogen-powered automotives and other alternative fuel automotives (e.g., fuels derived from resources other than petroleum). As referred to herein, a hybrid automotive is an automotive that has two or more sources of power, for example both gasoline-powered and electric-powered automotives.

The above and other features of the present disclosure are discussed infra.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
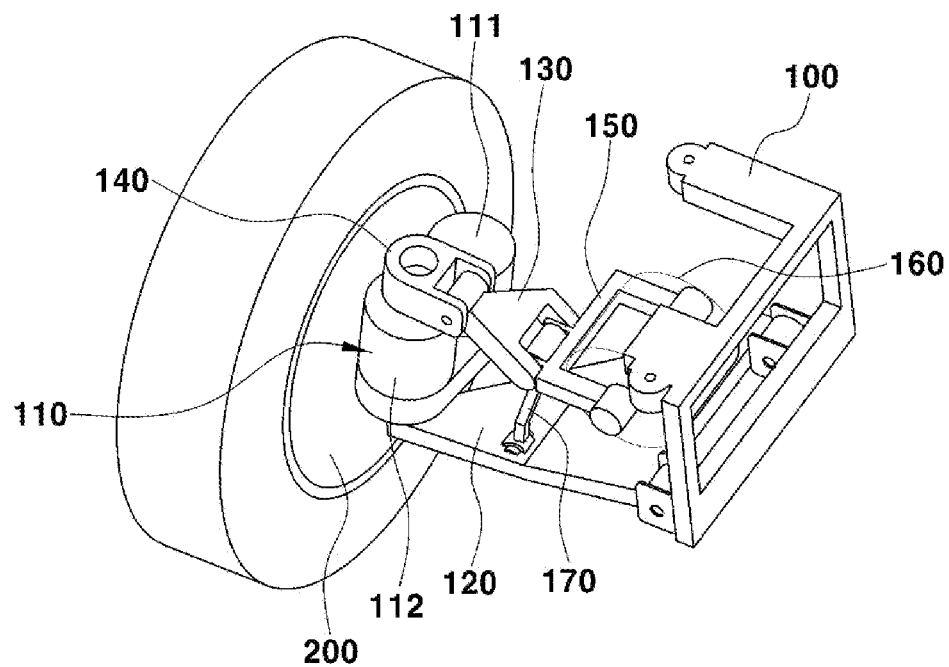
FIG. 1 shows a perspective view of a suspension according to an exemplary embodiment of the present disclosure.

It should be understood that the appended drawings are not necessarily to scale, presenting a somewhat simplified representation of various exemplary features illustrative of the basic principles of the present disclosure. The specific design features of the present disclosure as included herein, including, for example, specific dimensions, orientations, locations, and shapes will be determined in section by the particular intended application and use environment.

In the figures, reference numbers refer to the same or equivalent sections of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various embodiments of the present disclosure will be described in more detail with reference to the accompanying drawings. Embodiments of the present disclosure may be modified in various forms, and the scope of the present disclosure should not be construed as being limited to the following embodiments. The exemplary embodiment of the present disclosure is provided to more completely describe the present disclosure to those skilled in the art.

Furthermore, terms such as " . . . part", " . . . suspension", " . . . unit", and " . . . link" described in the specification mean a unit which processes at least one function or operation, which may be implemented in hardware or software or a combination of hardware and software.

Furthermore, the terms used in the specification are used only to describe specific embodiments, and are not intended to limit the embodiments. The singular expression includes the plural expression unless the context clearly dictates otherwise.

Furthermore, as a term used in the specification, it may be construed that a "height direction" refers to a height direction with respect to a vehicle, and a "length direction" refers to a direction in which a target configuration is formed.

Furthermore, in the specification, the names of the components are divided into front, rear, and the like to distinguish the names of the components in the same relationship, and the following description is not necessarily limited to the order.

Hereinafter, the exemplary embodiments will be described in detail with reference to the accompanying drawings, and in the description with reference to the accompanying drawings, the same or corresponding components are provided the same reference numerals, and overlapping descriptions thereof will be omitted.

The present disclosure relates to a suspension apparatus, and to a suspension structure mounted on a vehicle including an ultra-low ground clearance.

FIG. 1 shows a perspective view of a suspension according to an exemplary embodiment of the present disclosure.

As shown, the suspension is configured to be positioned between a vehicle body and a knuckle 200 to which the wheel is fixed. The wheel may be fastened to the knuckle 200, and the knuckle 200 may be integrally configured with a steering drive portion 110. A steering axis of the steering drive portion 110 may be fastened to a position corresponding to a kingpin axis formed in the knuckle 200 and configured to directly apply a steering angle of the wheel, or the steering drive portion 110 may be fastened adjacent to the kingpin axis and the steering axis of the steering drive portion 110 may be fastened to the knuckle 200 by coupling a rack and a tie rod and configured so that the steering angle is applied to the wheel through the steering drive portion 110. Furthermore, the steering drive portion 110 includes a steering motor portion 111 and a reducer 112. Furthermore, as an exemplary embodiment of the present disclosure, the reducer 112 is configured to be positioned adjacent to the steering motor portion 111 and to apply the steering angle to the wheel by being connected to the wheel and receiving a rotation force from the steering motor portion 111. The connecting link 130 is configured to be positioned at an upper end portion of the steering drive portion 110, and an upper arm 150 is configured to be positioned between the connecting link 130 and a frame. Furthermore, the lower arm 120 may be positioned at a lower end portion of the knuckle 200 or the steering drive portion 110, and the lower arm 120 may be fastened to the knuckle 200 or the steering drive portion 110 with a ball joint. Therefore, the knuckle 200 integrally rotated with the steering drive portion 110 is configured to rotate about the connecting link 130 at the upper end portion and the lower arm 120 at the lower end portion. Because a support link 140 may be included between the upper end portion of the steering drive portion 110 and the connecting link 130, the upper end portion of the steering drive portion 110 may be configured to rotate about the support link 140. Furthermore, because the lower arm 120 is configured to be positioned between the frame of the vehicle and the lower end portion of the steering drive portion 110, the lower end portion of the steering drive portion 110 may be connected to the lower arm 120 with the ball joint.

First end portion of the upper arm 150 is configured to be fastened to the connecting link 130, and the second end portion of the upper arm 150 adjacent to a vehicle body frame 100 is configured to be coupled to a damper 160. The damper 160 may be configured as a rotational damper 160 fixed to the frame. The damper 160 may be configured as a magneto-rheological (MR) damper 160 configured to perform deceleration using an MR fluid. As an exemplary embodiment of the present disclosure, the upper arm 150 may be fastened to a center axis of the rotational damper 160 and configured so that first end portion of the upper arm 150 is vertically moved about an axis in which the upper arm 150 and the damper 160 are fastened in response to the movement of the upper and lower end portions of the knuckle 200.

The rotational damper 160 applied to an exemplary embodiment of the present disclosure is configured to decrease a rotation speed of first end portion of the upper arm 150 and includes a damper housing, and the damper housing is positioned with the magnetorheological (MR) fluid filled. Because a magnetic core is disposed inside the housing, a controller 600 is configured to control an intensity of a magnetic field of the magnetic core in response to the rotational amount of the upper arm 150. The physical properties of the MR fluid are changed according to the changed magnetic field, and thus a resistance applied to the rotation axis of the upper arm 150 may be configured to vary.

The MR damper 160 may be configured to cause the MR fluid to perform a phase change into a solid by strengthening the intensity of the magnetic field of the magnetic core when the vertically set displacement of the upper arm 150 or more is applied, and thus configured to absorb the rotation force applied to the upper arm 150.

The controller 600 may be configured to determine the rotation force of first end portion of the upper arm 150 according to the change in the vehicle height measured by a vehicle height sensor and change the intensity of the magnetic field of the magnetic core in the MR damper 160 in response to the determined rotation force to vary the resistance applied from the MR damper 160.

First end portion of a push rod 170 is configured to be positioned at first end portion to which the connecting link 130 and the upper arm 150 are fastened, and the second end portion of the push rod 170 is configured to be fixed to the lower arm 120. The push rod 170 is configured so that first end portion of the upper arm 150 and the lower arm 120 are integrally moved in response to the vertical movement of the wheel.

Figure 2A:
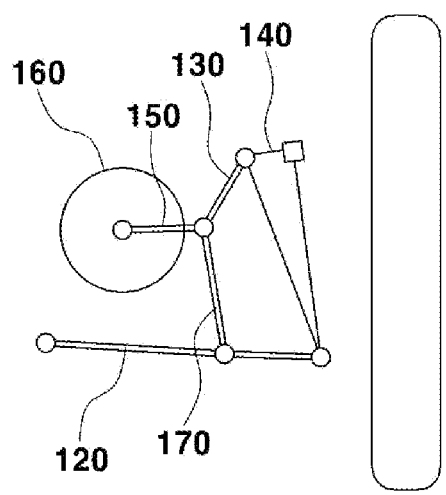
FIG. 2A shows the kinematic coupling relationship of the suspension as an exemplary embodiment of the present disclosure.

FIG. 2A shows a side view of the kinematic coupling relationship of the suspension as an exemplary embodiment of the present disclosure.

A steering motor integrally configured with the knuckle 200 has substantially the same rotation axis as the kingpin axis configured to drive the wheel, the upper end portion of the steering drive portion 110 is fastened to the connecting link 130, and the lower end portion of the steering drive portion 110 is fastened to the lower arm 120. The end portion of the connecting link is fastened to the upper arm 150, and the upper arm 150 is positioned on the center axis of the damper 160. The damper 160 is fixed to the vehicle body frame 100 and configured to resist the vertical movement of the upper arm 150.

Furthermore, the push rod 170 is positioned between first end portion to which the connecting link 130 and the upper arm 150 are fastened and the upper end portion of the lower arm 120. The push rod may be formed to have an angle suitable for effectively transmitting a force to resist the vertical movement.

Figure 2B:
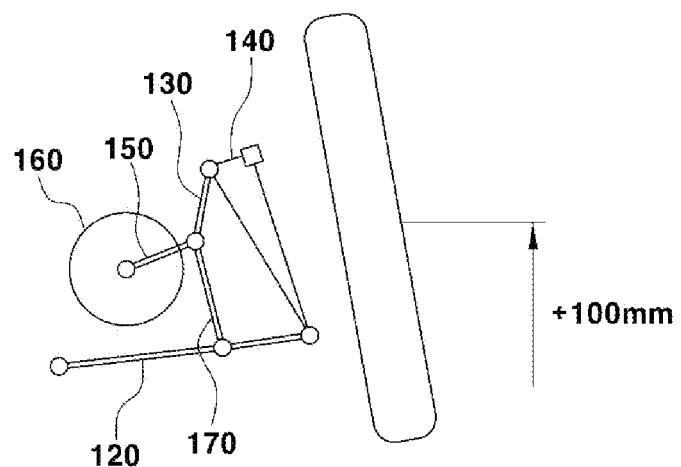
FIG. 2B shows the kinematic coupling relationship of a low-height suspension in a bump state as an exemplary embodiment of the present disclosure.

Furthermore, FIG. 2B shows the kinematic coupling relationship of the suspension in the bump state.

As an exemplary embodiment of the present disclosure, the bump state refers to a state in which the center axis of the wheel has moved up by 100 mm in a height direction of the vehicle. In the bump state, first end portion to which the lower arm 120 and the steering drive portion 110 are fastened is moved in the height direction with respect to first end portion of the frame of the vehicle integrally with the wheel. Furthermore, first end portion of the connecting link 130 to which the connecting link 130 and the support link 140 are fastened is also moved in the height direction integrally with the lower arm 120.

However, the second end portion of the upper arm 150 fastened to the damper 160 is configured to maintain the height fastened to the damper 160, and in the low-height suspension according to an exemplary embodiment of the present disclosure, a stroke limit may not occur from the bump state of the vehicle to the maximum 100 mm bump state.

Figure 2C:
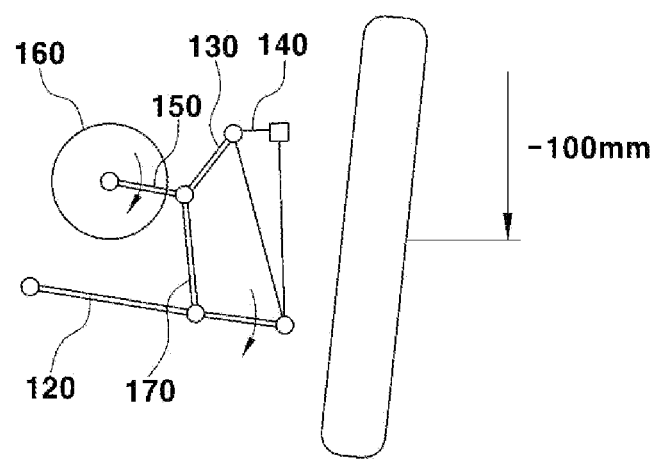
FIG. 2C shows the kinematic coupling relationship of the low-height suspension in a rebound state as an exemplary embodiment of the present disclosure.

FIG. 2C shows the kinematic coupling relationship of the suspension according to an exemplary embodiment of the present disclosure in the rebound state.

As an exemplary embodiment of the present disclosure, because the suspension is configured so that a center portion of the wheel moves down to the maximum 100 mm in the rebound state, first end portion of the lower arm 120 adjacent to the knuckle 200 and first end portion of the connecting link 130 are configured to move down in the height direction integrally with the wheel.

However, because the damper 160 fastened to the frame and the height of first end portion of the upper arm 150 fastened to the damper 160 are configured to be maintained, in an exemplary embodiment of the present disclosure, the stroke limit may not occur in response to the movement of the wheel to the maximum 100 mm in the rebound state.

In summary, the suspension according to an exemplary embodiment of the present disclosure includes the connecting link 130 so that stroke lengths of the upper arm 150 and the lower arm 120 are determined, and thus is configured so that the stroke upon bump and rebound of the wheel is relatively longer than that of the related art.

Figure 3:
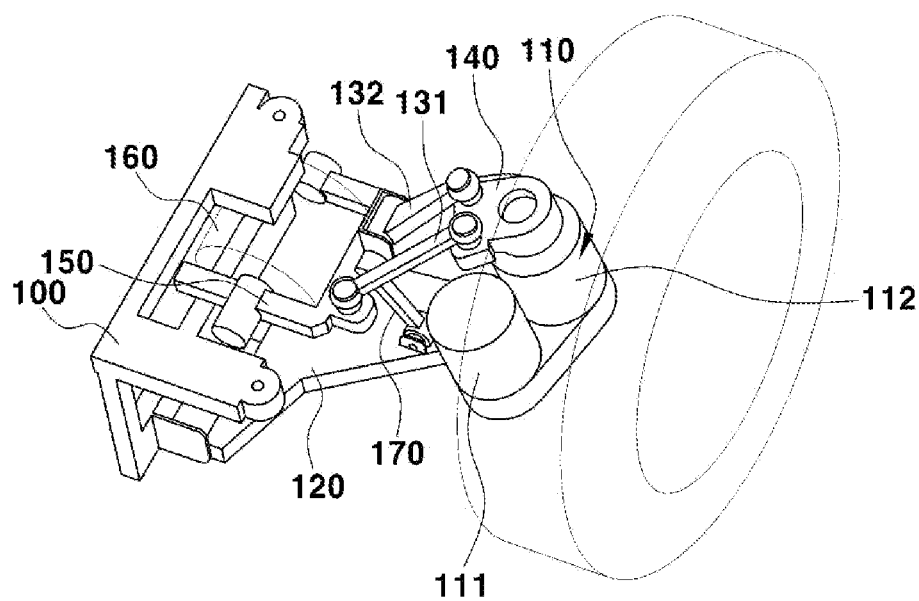
FIG. 3 is a perspective view of a suspension according to another exemplary embodiment of the present disclosure.

FIG. 3 shows a suspension including two different connecting links 130 as another exemplary embodiment of the present disclosure.

As in the configuration shown in FIG. 1, the suspension is configured to be positioned between the knuckles 200 fastened to the vehicle body and having the wheels fixed thereto. The wheel may be fastened to the knuckle 200, and the knuckle 200 may be configured integrally with the steering drive portion 110. Alternatively, the steering drive portion 110 may be fastened adjacent to the kingpin axis formed on the knuckle 200, and the drive axis of the steering drive portion 110 may be configured to apply the steering angle to the wheel through the steering of the rack and the tie rod.

A front connecting link 131 and a rear connecting link 132 are provided between the upper end portion of the steering drive portion 110 and the upper arm 150. The front connecting link 131 is configured to be fastened to the support link 140 positioned between the upper arm 150 and the upper end portion of the steering drive portion 110 with the ball joint. Furthermore, the rear connecting link 132 is configured to be fastened to the upper arm 150 with a rotational joint and configured to be fastened to the support link 140 positioned at the upper end portion of the steering drive portion 110 with the ball joint.

The front connecting link 131 and the rear connecting link 132 are mechanically configured to adjust a toe and/or camber of the wheel and configured to guide the vertical and longitudinal movement of the support link 140. Furthermore, the rear connecting link 132 is configured to transmit a vertical displacement value to the upper arm 150 in response to the vertical movement of the support link 140.

Figure 4:
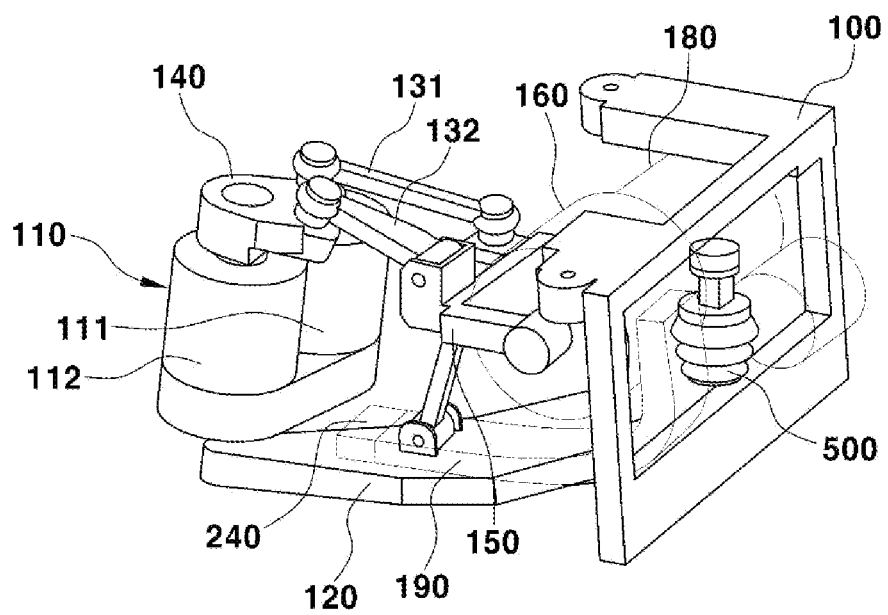
FIG. 4 shows a coupling diagram of components for performing the shock absorption of the suspension as another exemplary embodiment of the present disclosure.
Figure 5:
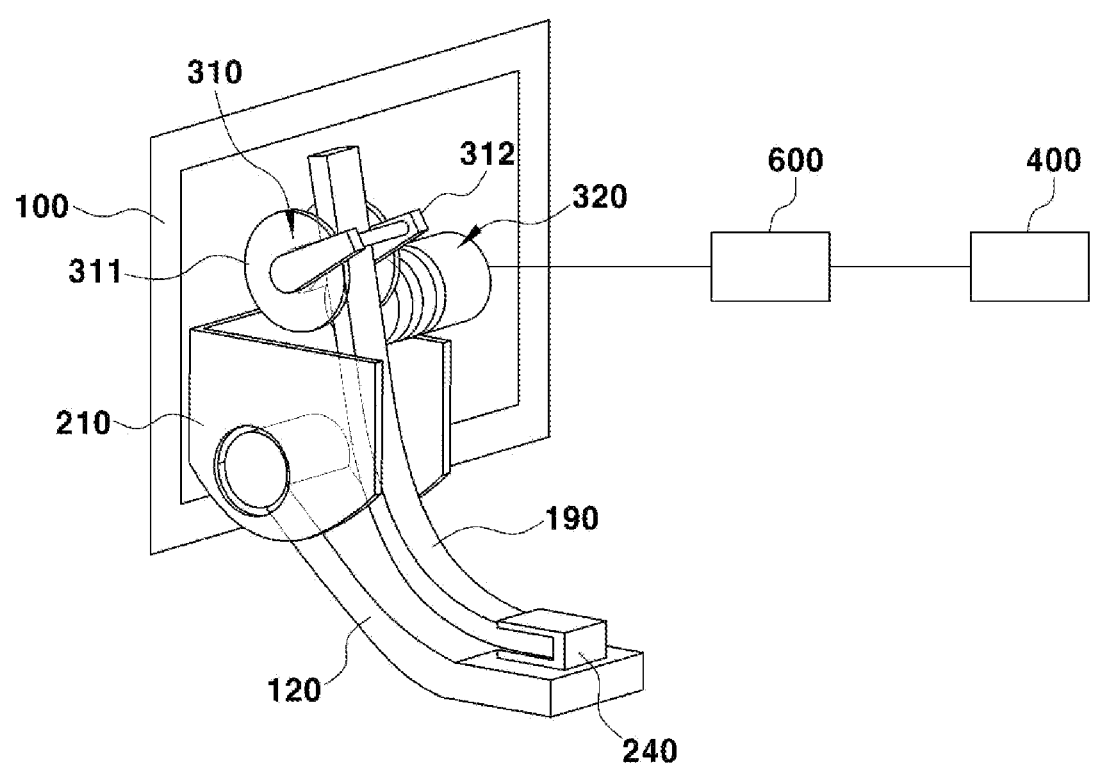
FIG. 5 shows the coupling relationship of a variable leaf spring of the suspension as an exemplary embodiment of the present disclosure.

FIG. 4 and FIG. 5 are perspective views of a suspension apparatus including a leaf spring 190 and a stopper 500 as an exemplary embodiment of the present disclosure.

In an exemplary embodiment of the present disclosure, the stopper 500 may be configured inside or outside the damper 160 to perform the limit of the stroke behavior in response to the stroke behavior of the wheel. The stopper 500 may be positioned at first end portion of the upper arm 150. Therefore, when the wheel stroke occurs, the damper 160 may be configured to provide a force to resist the rotation force of the end portion of the upper arm 150, and the stopper 500 may be configured to limit a length at which first end portion of the upper arm 150 moves down. As described above, as an exemplary embodiment of the present disclosure, the stopper 500 is fixed on the upper arm 150 and configured to limit the vertical movement of the wheel by the vehicle body frame 100.

Furthermore, the present disclosure provides the leaf spring 190 positioned in a width direction of the suspension. First end portion of the leaf spring 190 according to an exemplary embodiment of the present disclosure is configured to be fixed to a fastening portion 240 positioned on the lower arm 120, and a support point of the second end portion of the leaf spring 190 is configured to be positioned to come into contact with the support unit positioned to be fastened to the vehicle body. The support unit may be positioned adjacent to the vehicle body frame 100, and the second end portion of the leaf spring 190 is configured to be fastened to the support point of the support unit to control the support unit to have a variable length. Furthermore, the second end portion of the leaf spring 190 is configured to extend to the outside of the support point. In an exemplary embodiment of the present disclosure, the leaf spring 190 may be made of a carbon fiber reinforced plastic (CFRP).

A fixing frame 210 is fixed to the vehicle body frame 100 at a position adjacent to the damper 160 and the second end portion thereof is fastened to the lower arm 120, and thus configured so that the support point of the leaf spring 190 is changed when the lower arm 120 is rotated in the height direction with respect to the vehicle fixing frame 210.

Furthermore, at least a portion of the leaf spring 190 is configured to be positioned along the lower arm 120. Furthermore, first end portion of the lower arm 120 fastened to the leaf spring 190 may be positioned adjacent to first end portion where the push rod 170 and the lower arm 120 meet so as not to interfere with each other.

Furthermore, first end portion of the leaf spring 190 is positioned to be fixed to the lower arm 120 through the fastening portion 240, and thus configured so that first end portion of the leaf spring 190 and the lower arm 120 are integrally bolt-fastened. The second end portion of the leaf spring is configured so that the support point is positioned on the support unit, and is configured to be positioned to come into contact with a spring support portion 310 of the support unit.

The support unit includes the spring support portion 310 positioned to come into contact with the leaf spring 190 and a spring drive portion 320 configured to apply a driving force to change a position of the spring support portion 310. The spring drive portion 320 has first end portion fixed to the vehicle body frame 100 and an output end portion of the second end portion fastened to the spring support portion 310. Furthermore, when the spring support portion 310 is eccentrically fastened to the output end portion of the spring drive portion 320 and receives the driving force of the spring drive portion 320, a center axis of the spring support portion 310 has a variable position by rotating about a rotation axis of the spring drive portion 320. Therefore, as the spring support portion 310 rotates, the support point of the second end portion of the leaf spring 190 facing the spring support portion 310 is configured to vary in the longitudinal direction of the leaf spring 190. The position of the spring support portion 310 coming into contact with the support point of the second end portion of the leaf spring 190 in response to the bidirectional rotation of a motor portion of the spring drive portion 320 is configured to be controlled to increase or decrease a length of both end portions coming into contact with the leaf spring 190.

The spring drive portion 320 includes the motor portion configured to apply the rotation force to the spring support portion 310, a clutch portion positioned at an output axis of the motor portion and configured to transmit the bidirectional rotation of the motor portion, and a reducer positioned at an output end portion of the clutch portion to control the rotational amount of the output end portion in response to the rotational amount of the motor portion. The motor portion has the rotational amount set in response to the setting of the controller 600 and apply the rotation of the output end portion fastened to the spring support portion 310 in response to the set rotational amount. Furthermore, the clutch portion is configured to transmit the rotation force to the output end portion thereof in response to the bidirectional rotation of the motor portion and control the position of the spring support portion 310 by rotating the spring support portion 310 in response to the transmitted rotation force.

The spring support portion 310 is configured to be positioned to come into contact with the second end portion of the leaf spring 190, and a side surface thereof is configured to be fastened to the output end portion of the spring drive portion 320. The spring support portion 310 includes a support cam 311 fastened to the leaf spring 190 and a spring guide 312 configured to surround at least a portion of the leaf spring 190.

The spring guide 312 may include a spring guide link configured to be rotated along a center axis of the support cam 311 and a spring guide bar configured to come into contact with one side surface of the leaf spring 190. Furthermore, the spring guide 312 bar may be positioned to be fastened to have a degree of rotational freedom with respect to the spring guide link.

In an exemplary embodiment of the present disclosure, the support cam 311 is configured in a shape of cylinder, and configured so that the leaf spring 190 is positioned to come into contact with an external circumferential surface of the support cam 311. Moreover, the output end portion of the spring drive portion 320 is eccentrically fastened to a side surface of the support cam 311 with respect to the center axis thereof. Therefore, when the rotation force of the motor is applied, the support cam 311 is configured to rotate along the output end portion of the spring drive portion 320 and configured so that the position of the support point of the second end portion of the leaf spring 190 positioned to come into contact with the support cam 311 is moved integrally with the support cam 311.

Furthermore, in an exemplary embodiment of the present disclosure, a vehicle height sensor 400 may be further included. Therefore, when the vehicle height of the vehicle measured by the vehicle height sensor 400 is lower than a set range (set value), the controller 600 is configured so that the second end portion of the leaf spring 190 is moved to a position close to first end portion of the leaf spring 190 by performing the driving of the spring drive portion 320 and performing the rotation of the spring support portion 310. Therefore, the stiffness of the leaf spring 190 is controlled to increase.

Conversely, when the vehicle height of the vehicle measured by the vehicle height sensor 400 is higher than the set range (set value), the controller 600 is configured so that the second end portion of the leaf spring 190 is moved to a position far from first end portion of the leaf spring 190 by performing the driving of the spring drive portion 320 in the other direction and performing the rotation of the spring support portion 310 in the other direction thereof. Therefore, the stiffness of the leaf spring 190 is controlled to decrease.

As described above, the controller 600 according to an exemplary embodiment of the present disclosure may be configured to control the stiffness of the leaf spring 190 to perform the height adjustment in response to the measured vehicle height of the vehicle.

Furthermore, in an exemplary embodiment of the present disclosure, the controller 600 may receive the bump state or the rebound state of the vehicle and control the support unit in response to the received state of the vehicle. For example, when the bump state of the wheel stroke is measured, the controller 600 is configured to control the support unit so that the second end portion of the leaf spring 190 is moved to the position close to first end portion of the leaf spring 190, and conversely, in the rebound state of the wheel stroke, controls the support unit so that the second end portion of the leaf spring 190 is moved to the position far from the first end portion of the leaf spring 190.

Therefore, the controller 600 is configured to control the position of the spring support portion 310 to vary the stiffness of the leaf spring 190 in consideration of the vehicle height or wheel stroke state measured in the vehicle.

Figure 6:
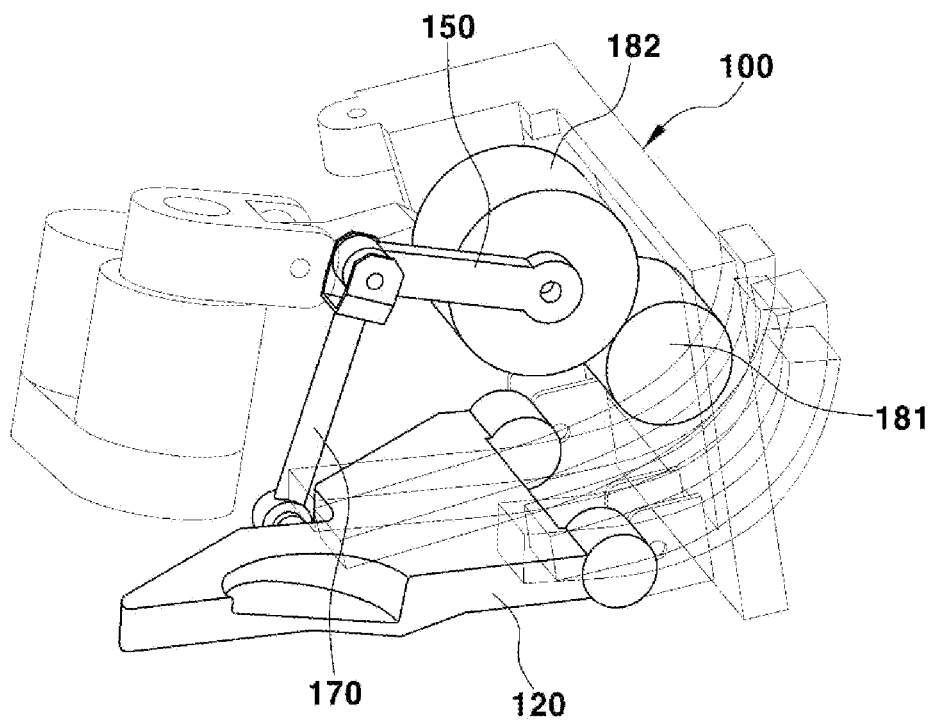
FIG. 6 shows the coupling relationship of an active suspension of the suspension as an exemplary embodiment of the present disclosure.

FIG. 6 shows an enlarged view of an active suspension 180 as an exemplary embodiment of the present disclosure.

The active suspension 180 has first end portion fastened to the center portion rotation axis of the upper arm 150 and is positioned to be fixed to the vehicle body frame 100 and includes a drive motor 181 configured to perform deceleration and a reducer 182 fastened to the drive motor 181. The active suspension 180 according to an exemplary embodiment of the present disclosure may include a harmonic reducer 182, and the drive motor 181 and the harmonic reducer 182 may be configured to be rotatably fastened to each other through a belt. An external surface of the reducer 182 may be formed of an elastic body.

Furthermore, in an exemplary embodiment shown in FIG. 4, a center axis of both sides of the damper 160 is configured to be fastened to the upper arm 150 and may include the active suspension 180 positioned on the external surface of the upper arm 150. Therefore, the damper 160 and the active suspension 180 may be configured to limit the vertical movement of the upper arm 150 in response to the vertical movement of the upper arm 150.

In other words, as shown in FIG. 6, the active suspension 180 includes the reducer 182 and the elastic body fastened to the outside of the upper arm 150 and the drive motor 181 fastened to a center axis of the reducer 182. Furthermore, because the center axes of the reducer 182 and the drive motor 181 are fastened to each other to be simultaneously driven, the active suspension 180 is configured to be positioned to decrease the rotation force of the upper arm 150.

As described above, the damper 160 and the active suspension 180 according to an exemplary embodiment of the present disclosure are positioned to decrease the rotation force of first end portion generated according to the vertical movement of the upper arm 150, and thus are configured to limit the movement of the wheel stroke in the height direction thereof.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A suspension apparatus comprising:
   a knuckle to which a wheel of a vehicle is fastened;
   a steering drive portion connected to the knuckle;
   a lower arm positioned at a lower end portion of the steering drive portion and including a first end portion connected to the knuckle and a second end portion connected to a vehicle body frame;
   a connecting link including a first end portion connected to an upper end portion of the steering drive portion;
   an upper arm connected to a second end portion of the connecting link;
   a damper connecting the upper arm and the vehicle body frame;
   a push rod including a first end portion connected to the upper arm and a second end portion connected to the lower arm; and
   a support link positioned between the upper end portion of the steering drive portion and the connecting link, thus connecting each other,
   wherein the knuckle, the steering drive portion, the lower arm, the connecting link, the upper arm, and the support link are configured to provide a 6-bar link structure.

2. The suspension apparatus of claim 1, wherein the damper is configured as a rotation type damper rotatably connected to the upper arm.

3. The suspension apparatus of claim 1,
   wherein the damper is configured as a magneto-rheological (MR) damper configured to perform deceleration using an MR fluid, and
   wherein a controller is configured to control an intensity of a magnetic field in a magnetic core of the MR damper in response to a rotational amount of the upper arm.

4. The suspension apparatus of claim 1, further including a leaf spring connecting the vehicle body frame and the lower arm.

5. The suspension apparatus of claim 1, further including an active suspension connecting the upper arm and the vehicle body frame.

6. The suspension apparatus of claim 5, wherein the active suspension includes a drive motor so that the upper arm is rotated by the drive motor.

7. The suspension apparatus of claim 6, wherein the active suspension further includes a reducer and is connected to the reducer so that the upper arm is rotated.

8. The suspension apparatus of claim 1, further including a stopper fixed to the upper arm to restrict a vertical behavior of the wheel.

9. The suspension apparatus of claim 1, wherein a steering axis of the steering drive portion is configured to be aligned with a kingpin axis of the wheel.

10. The suspension apparatus of claim 1, wherein a steering axis of the steering drive portion is configured to be connected to the knuckle by coupling a rack and a tie rod.

11. The suspension apparatus of claim 1, wherein the steering drive portion includes a steering motor portion.

12. The suspension apparatus of claim 11, wherein the steering drive portion further includes a reducer.

13. A suspension apparatus comprising:
    a knuckle to which a wheel of a vehicle is fastened;
    a steering drive portion connected to the knuckle;
    a lower arm positioned at a lower end portion of the steering drive portion and including a first end portion connected to the knuckle and a second end portion connected to a vehicle body frame;

a connecting link including a first end portion connected to an upper end portion of the steering drive portion;

an upper arm connected to a second end portion of the connecting link;

a damper connecting the upper arm and the vehicle body frame;

a push rod including a first end portion connected to the upper arm and a second end portion connected to the lower arm; and a support link positioned between the upper end portion of the steering drive portion and the connecting link, thus connecting each other, wherein the connecting link includes:
- a front connecting link including first and second end portions connected via a ball joint; and
- a rear connecting link including a first end portion fastened to the upper arm with a rotational joint and a second end portion connected to the support link with the ball joint.

14. The suspension apparatus of claim 13, wherein the front connecting link is fastened to the support link positioned between the upper arm and the upper end portion of the steering drive portion.

15. The suspension apparatus of claim 13, wherein the rear connecting link is fastened to the upper arm with the rotational joint and to the support link positioned at the upper end portion of the steering drive portion.

* * * * *